May 8, 1928.
H. B. MORRILL
1,668,655
PRESSURE REGULATOR
Filed Feb. 12, 1925    2 Sheets-Sheet 2
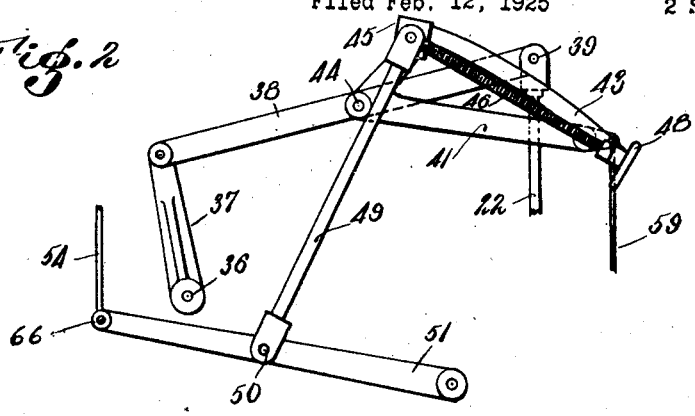
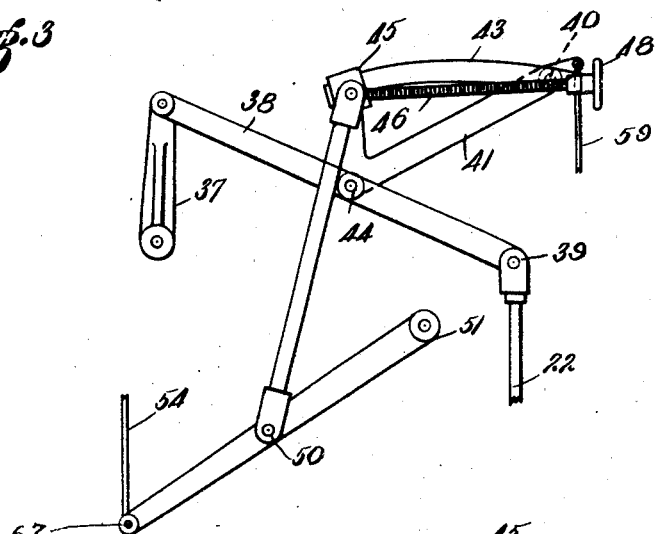
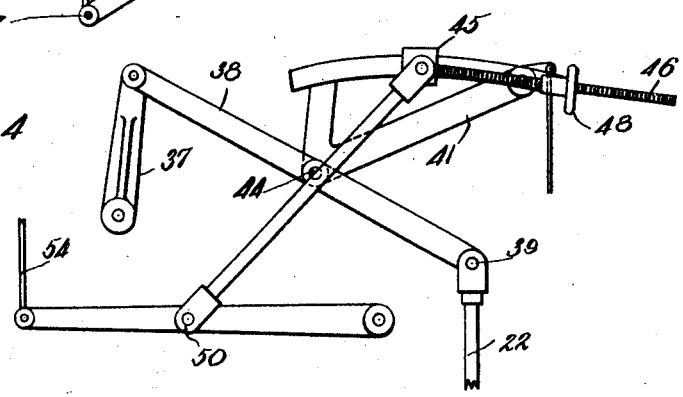
Inventor
Herbert B. Morrill,
by Roberts, Roberts & Cushman
Attys.

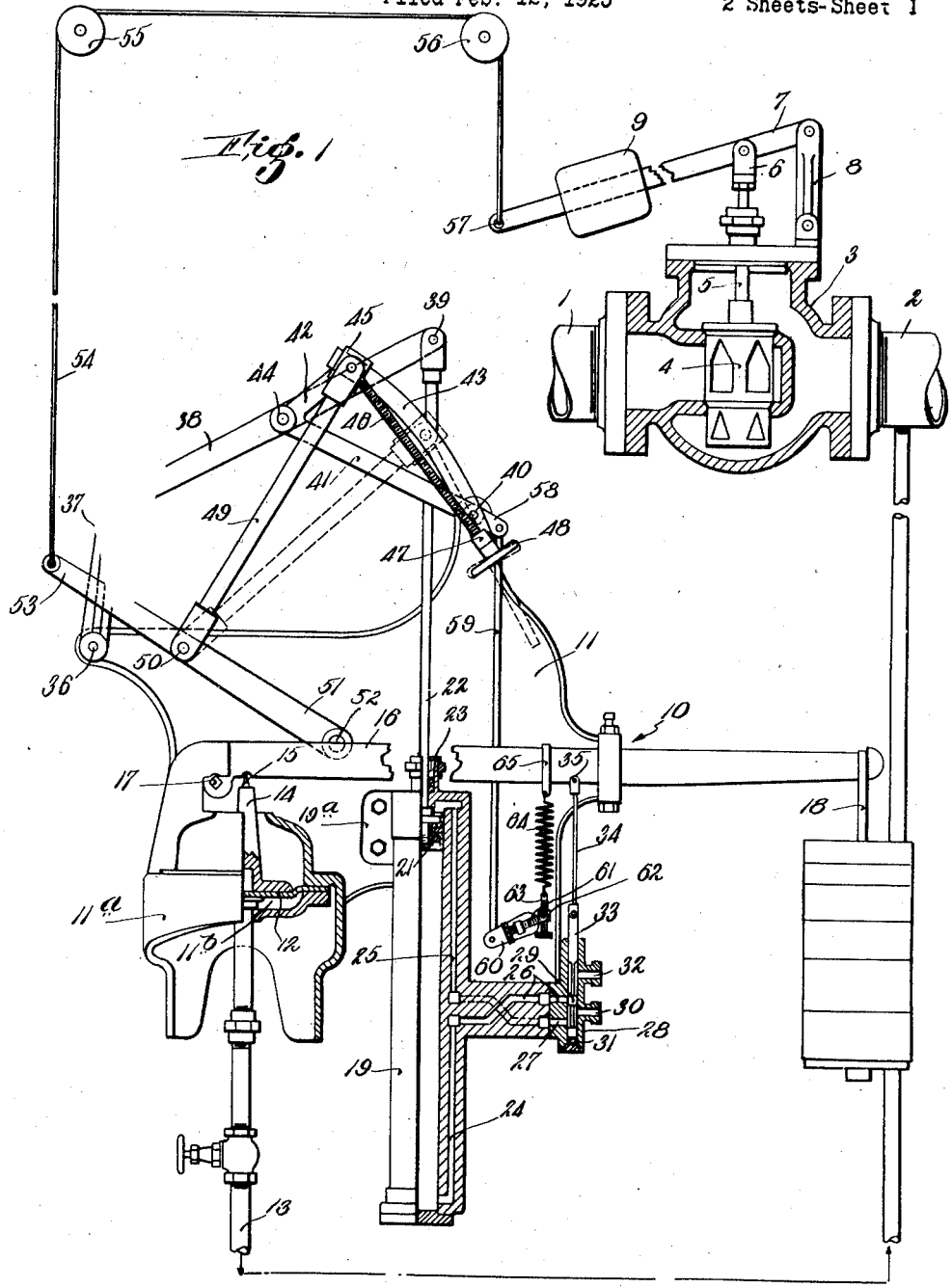

Patented May 8, 1928.

1,668,655

UNITED STATES PATENT OFFICE.

HERBERT B. MORRILL, OF SALEM, MASSACHUSETTS.

PRESSURE REGULATOR.

Application filed February 12, 1925. Serial No. 8,685.

This invention pertains to pressure actuated regulators of the type commonly employed for controlling valves, for example, reducing valves, dampers, etc., and has for its principal object the provision of adjusting means of a simple, durable and readily accessible character applicable to regulators of usual and known type whereby to improve the accuracy and certainty of operation of such regulators and to adapt regulators of standard sizes and types to a wider range of usefulness.

Regulators of the type to which the present invention relates are usually associated with a controlled element, for example, a reducing valve, pressure unloading valve, damper, or the like, for varying the pressure or rate of fluid flow in a duct or chamber, for example a steam or water pipe or a steam boiler, and comprise mechanism, for example, a piston moving in accordance with variations in pressure in said duct or chamber for adjusting the reducing valve or damper.

As ordinarily constructed such regulators are furnished to the user in uniform sizes and designed to meet standard pressure conditions and, while capable of operating through a range of pressures which varies to a slight degree from the standard for which they are designed, are in most cases incapable, without substantial change or alteration in the parts, of handling the very wide range of pressure conditions met in certain industrial establishments.

When working at relatively low pressures the standard form of regulator is sometimes fairly satisfactory but when subjected to the extremely high pressures now commonly in use the regulator parts have a tendency to "hunt" or to keep in constant motion, due to repeated over-regulation, first in one direction and then in the other. This results in fluctuations in pressure in the pipe or chamber in which the pressure is to be regulated and also causes rapid wear of the regulator parts.

While in some instances users of regulators have partially overcome these difficulties by lengthening or shortening the valve actuating levers by a cut and dry method, such mode of reaching the desired results is decidedly unsatisfactory as it necessitates shutting off the pressure with consequent loss of production in the plant, and is at best a mere makeshift since the new arrangement is also limited in its pressure range and is rendered inaccurate by any further change in the working pressure.

I am aware that certain attempts have been made to provide the reducing valve or other controlled element with an actuating lever of adjustable length, but as such valves or controlled elements are often located in inaccessible positions, for example, high up above a boiler, the connections are frequently allowed to go unadjusted by reason of the difficulty involved in making the adjustment.

In accordance with the present invention the ratio of movement of the valve or other controlled element with respect to the travel of the piston of the actuating motor may be varied through a very wide range and with great accuracy, the adjusting means being of such character that it can readily be located at a convenient point remote from the valve. This improved adjusting means is so devised that it does not interfere with complete closure of the valve or damper whatever the adjustment of the parts and with this improved adjusted means there may readily be associated, if desired, compensating means for preventing over-sensitiveness of the regulator parts.

In the accompanying drawings I have shown by way of example one preferred embodiment of the invention as illustrative of the large number of equivalent mechanism which may doubtless be devised operating upon the same general principle and falling within the scope of the appended claims.

In such drawings,

Fig. 1 is a side elevation, of more or less diagrammatic character, partly in vertical section and partly broken away, illustrating the improved adjusting mechanism as applied to a pressure reducing valve regulator of well known construction; and Figs. 2, 3 and 4 are diagrammatic views illustrating various operative positions of the links and levers comprising the controlling mechanisms.

Referring to the drawings the numeral 1 indicates one end of a pipe or duct through which steam or other fluid flows and the numeral 2 designates another section of the same pipe. A valve casing 3 is interposed between and connects the pipe sections 1 and 2. For the purpose of discussion the fluid may be considered as flowing from the section 1 to the section 2, although the direction of flow is immaterial. This valve casing is provided with a valve 4, shown as of balanced type, having an actuating stem 5 connected by a shackle 6 to a valve lever 7 which in turn is pivoted at one end on the upper end of a rock arm 8 pivotally mounted upon the valve casing. An adjustable counterweight 9 is mounted upon the valve actuating lever 7.

While for convenience in description and illustration a pressure reducing valve is herein shown and described it is to be understood that this valve is merely emblematic of various devices, such for example as pressure unloading valves, dampers, stoker control valves and other parts, all of which may be designated generally as "controlled elements" and which by their movement either directly or indirectly cause a variation in pressure in a pipe, container, or chamber with which they are immediately or remotely associated. With this understanding the pipe section 2 of the drawings may be considered as typical of any such pipe, chamber, or container in which the pressure is varied either directly or indirectly by actuation of the controlled element.

The numeral 10 indicates generally the actuating mechanism which controls and moves the controlled element. This controlling and actuating mechanism comprises moving parts preferably mounted upon a suitable supporting frame 11.

Mounted upon or forming a part of this frame 11 is a housing 11ª providing a chamber 11ᵇ which is closed at one side by a movable wall 12. This movable wall may be a flexible diaphragm as herein illustrated, or if desired, a reciprocating piston. The chamber 11ᵇ is connected by means of a pipe 13 to the pipe section 2 above referred to, it being understood that the controlling and regulating mechanism 10 may be located at a point remote from the controlled element and where it is readily accessible to the operator.

The diaphragm 12 is furnished with a stem 14 terminating in a knife edge 15 bearing against the lower edge of a lever 16 at a point closely adjacent to the fulcrum 17 of the latter. A weight 18 or other suitable resistance supplying means is connected to the outer end of the lever 16, such weight or other means tending to oppose a substantially constant resistance to upward movement of the lever by the pressure actuated diaphragm 12.

At a point adjacent to the lever 16 a cylinder 19 is attached by means of a bracket 19ª to the frame 11. This cylinder 19 is furnished with a piston 21 having a piston rod 22 passing through a stuffing box 23 at the upper end of the cylinder. The cylinder is provided with channels 24 and 25 in its wall leading from its central part to its opposite ends and these channels terminate in ports 26 and 27 respectively in a valve housing 28. This valve housing is furnished with a passage in which a piston 29 is arranged to slide. The valve housing is furnished with an inlet port 30 to which pressure fluid, for example, water or steam, may be admitted from a suitable source and is also furnished with an exhaust port 32 at its upper end. An exhaust passage 31 leads from the lower end of the chamber in the valve housing to the exhaust port.

The valve 29 is furnished with a stem 33 connected by a link 34 to the central part of the lever 16, the arrangement being such that when the lever 16 drops, the supply port 30 is connected to the port 27 leading to the upper end of the cylinder 19 and when the lever 16 rises the supply is connected to the other end of the cylinder through the passage 24.

The frame 11 is furnished with bearings at 36 for a rock arm 37 to which one end of a link 38 is pivotally connected. The opposite end of the link 38 is pivotally connected to the upper end of the piston rod 22. The frame 11 is also furnished with bearings at 40 providing a pivotal support for a segmental lever comprising the lower member 41, the outer end member 42 and the upper arcuate member 43. This segmental lever is pivotally connected at 44 to the link 38 at a point intermediate the ends of the latter.

A slide block 45 is mounted upon the arcuate member 43 of the segment lever and is adapted to slide thereon toward and from the pivotal axis 40 of the lever. A screw threaded rod 40 is pivotally secured at one end to the slide block 45, the opposite end of the rod passing freely through a guide opening in a bracket 47 mounted upon the end of the member 43. A hand wheel 48 internally screw threaded to engage the rod 40 is mounted upon the outer end of the latter so that by turning the hand wheel the block 45 may be moved longitudinally of the member 43, the hand wheel being prevented from moving axially by suitable means, not shown, connecting it to the bracket.

A radius link 49 is pivotally secured at one end to the block 45 and at its other end is connected by a pivot pin 50 to a lever 51. The point 50 forms the center of curvature of the member 43 so that the block 45 with the radius arm 49 may be moved along the member 43 without changing the relation between the lever 51 and the segment lever.

The lever 51 is pivotally supported at 52 upon the frame 11 and its free end 53 is connected by suitable means, for example, the flexible chain or cable 54, passing over guide pulleys 55 and 56, to the outer end 57 of the lever 7.

The member 41 of the segment lever is preferably extended beyond the pivot 40,— to the right as viewed in Fig. 1, to provide an arm 58, and the upper end of a link 59 is connected to this arm. The link 59 is pivotally connected at its lower end to a rocker 60 pivotally supported upon the frame. This rocker is provided with an extension arm 61, conveniently formed as a screw threaded rod adjustable longitudinally of the rocker, and this adjustable arm 61 is provided at its end with a nut 62 in which a second screw threaded rod 63 is adjustably mounted. The upper end of the rod 63 is connected by a tension spring 64 to a stirrup 65 mounted on the lever 16.

In describing the operation of the device it is assumed for convenience that the controlled element is the valve 4 and that as this valve is opened the pressure in the pipe 2 will gradually increase and that as the valve is closed the pressure will decrease. Assuming that the valve is closed and that the other parts are in the position shown in Fig. 1 the pressure in the chamber 11ᵃ is assumed to be substantially atmospheric and the lever 16, under the action of weight 18, will have dropped to its lowest position and the valve 29 will be in such a position as to permit pressure fluid from the port 30 to enter the upper end of the cylinder 19. As soon as pressure fluid enters the upper end of the cylinder the piston 21 is driven down and, if it make a full stroke, moves the lever 51 from the position indicated in Fig. 1 through the positions successively indicated at 66, and 67 (Figs. 2 and 3). Such downward movement of the lever 51 raises the valve lever 7, opens the valve 4 and permits pressure to build up in the pipe 2. As soon as the pressure begins to rise in the pipe 2 it reacts upon the diaphragm 12, tending to raise the latter, and when the pressure becomes sufficient the diaphragm rises lifting the lever 16 and at a certain point in the travel of the latter moving the valve 29 upwardly until it cuts off the fluid supply to the upper end of the cylinder 19. The piston 21 is normally brought to rest before it completes its full down stroke, but, if the pressure in the pipe 2 continues to increase beyond that for which the mechanism is set, the lever 16 will continue to rise and will move the valve 29 to such a point that it admits pressure fluid into the lower end of the cylinder 19, thus moving the piston 21 upwardly and, through the connections described, moving the valve 4 back toward its initial closed position.

With the parts adjusted as shown in Fig. 1 a full downward stroke of the piston 21 will carry the lever 51 to the position indicated at 67 in Fig. 3, this adjustment providing the maximum ratio of movement between the valve and the piston. If it be found that this setting of the parts causes over travel of the valve with consequent "hunting" the operator may turn the hand wheel 48 thus moving the slide block 45 nearer to the pivotal point 40 of the segmental lever.

This adjustment of block 45 along the segment lever causes no change in the relative position of the valve and piston, but upon subsequent movement of the piston the valve will be moved to a less degree than formerly for any given travel of the piston as illustrated in Fig. 4.

If desired the slide block 45 may be adjusted to such an extent as to prevent all movement of the valve 4 by the piston 21 so that the regulating action may be dispensed with in this way.

As the controlling mechanism including the adjusting wheel 48 may be positioned at any desired and convenient point which may be remote from the valve, it is evident that the operation of the latter may easily be controlled, and that by the variable ratio of movement provided for, the valve may be caused to move to the proper amount to correspond to any desired pressure variation.

In order to avoid oversensitiveness of the parts the compensating arrangement comprising the spring 64 may be provided, although this feature of the mechanism may be omitted if desired and in many cases will be omitted. When this device is employed, the downward movement of the piston 21 as above described corresponding to and upward movement of lever 16 causes the end of the arm 58 to rise, thus pulling up on the link 59 and tensioning the spring 64. This increases the resistance to upward movement of the lever 16 so that subsequent increments in pressure in the chamber 11ᵇ are opposed by progressively greater resistances acting on the lever 16. The operation is thus gradually slowed down so that the controlled part is not moved to an excessive extent. This compensating arrangement is particularly desirable when the controlled part is a flue damper, whose action upon the boiler pressure is apparent only after a considerable interval of time.

By adjusting the screw 63 the initial tension for the spring 64 may be varied while by adjusting the screw threaded rod 61 the rate of application of the added spring resistance applied to the lever 16 may be varied.

While a double acting fluid motor has been illustrated it is contemplated that a single acting motor may be used, if desired, the valve or other controlled element being moved in one direction by means of a weight or springs, for example, the weight 9.

An important feature of the invention as described resides in the fact that, regardless of the position of the block 45 upon the segment lever, the lever 15 always occupies the same position when the piston 21 is at the upper limit of its stroke. Thus if the upper limit of the piston 21 corresponds to the closed or normal position of the valve, damper, or other controlled element, the adjustment of the ratio of movement between the piston 21 and the valve will not in any way change such normal position or cause the valve or damper to remain in a partially open condition.

While a specific arrangement of mechanism has herein been illustrated for purposes of description it is to be understood that the invention is not to be limited to this particular arrangement, but that other and equivalent combinations of parts may be substituted therefor without departing from the spirit of the invention.

I claim:

1. The combination with a valve and a pressure regulated fluid motor for moving the valve, said motor having a piston provided with a piston rod, of a rock lever fulcrumed at one end, connections extending from the other end of said lever to the valve, a radius link pivotally connected at one end to an intermediate part of the rock lever, a segment lever provided with an arcuate guide struck with said radius link as a radius and the pivotal connection of said link to the rock lever as a center, a slide adjustable along the arcuate guide, said slide being pivotally connected to the radius link, means for adjusting the slide, a rock arm pivoted at one end to a fixed support, a link pivotally connected at one end to the rock arm and at its other to the piston rod, and means pivotally connecting the segment lever to an intermediate point of said latter link.

2. The combination with a conduit having a controlling valve therein and a remotely situated pressure regulated fluid motor for moving the valve, the motor having a reciprocating piston, a fluid admission port for the motor, and means responsive to pressure change in said conduit for opening and closing said port, of a piston rod moving with the motor piston, a curved arm pivoted at one end to a fixed support, a link pivotally connected at one end to the piston rod, means guiding the other end of said link in a predetermined path, means connecting the free end of the curved arm to said link intermediate the ends of the latter, a slide adjustable along the curved arm, a rock arm, a radius link connected at one end of the slide and at the other end to the rock arm, and a flexible connection for transmitting movement from the rock arm to the controlling valve.

3. The combination with a conduit having a controlling valve therein and a pressure regulated fluid motor for moving the valve, said motor having a piston provided with a piston rod and means responsive to pressure change in the conduit for determining admission of pressure fluid to the motor, of a substantially triangular lever pivoted upon a fixed support adjacent to one of its angles and having an arcuate edge extending from said angle, a link connected adjacent to one of its ends to the piston rod, the opposite end of the link being guided to move in an arcuate path, means connecting the free end of the triangular lever to the link, a slide adjustable along the arcuate edge of the triangular lever, a rock arm, means connecting said slide with the rock arm, and connections between the rock arm and controlling valve.

4. The combination with a controlled element, a fluid motor comprising a reciprocating part, a segment lever having a curved arm, a slide block movable along said arm, means for adjusting the slide block, connections between the reciprocating part of the motor and the segment lever for oscillating the latter, connections for transmitting movement of oscillation of the slide block to the controlled element, means for regulating the motor comprising a movable member, a pressure actuated part for moving said member, and means for opposing progressively increased resistance to movement of said movable member as the latter recedes from normal position, said means comprising a spring and means actuable by the segment lever for varying the tension of the spring.

5. The combination with a controlled element, a fluid motor comprising a piston, a lever pivoted intermediate its ends, means connecting the piston to one end of said lever whereby movement of the piston oscillates the lever, a slide member adjustable along the lever toward and from the fulcrum of the latter, connections from said slide member to the controlled element, of means for regulating the motor comprising a movable valve, a pressure actuated part for moving the valve, means for opposing progressively increasing resistance to movement of the valve from normal position, said means comprising a tension spring, and connections for transmitting movement from the opposite end of said lever to the spring for varying the tension of the latter, said connections being adjustable to vary the initial tension of the spring and also the rate of application of the increased tension thereto.

6. The combination with a controlled element, a fluid motor having a piston and piston rod, of means for regulating the motor comprising a fluid admission valve, a lever for moving the valve, means opposing constant resistance to movement of the lever in a direction to open the valve, a pressure operated device for moving the lever to open the valve, a tension spring connected to the lever, a rocker provided with an adjustable extension, means connecting said extension to the spring, said latter means being adjustable to vary the tension of the spring, a two-armed lever, means connecting the piston to one arm of the piston to oscillate the latter, means connecting the other arm of the lever to the rocker, and means for transmitting movement from the lever to the controlled element.

7. The combination of a valve, a remotely situated pressure regulated motor for moving the valve, said motor being provided with a piston and means connecting the piston to the valve, said means including a swinging element mounted upon a pivot and responsive to the movement of said piston and a member adjustable along said swinging element, said member being operatively connected to said valve whereby the ratio of the valve movement in relation to the piston movement may be varied by adjustment of the member along the swinging element or whereby the reciprocating movement of the piston may actuate the swinging member without affecting the valve.

Signed by me at Boston, Massachusetts, this 31st day of January, 1925.

HERBERT B. MORRILL.